United States Patent
Tomioka et al.

Patent Number: 6,024,788
Date of Patent: Feb. 15, 2000

[54] ASPHALT ADDITIVE

[75] Inventors: Keiichiro Tomioka; Ryoichi Tamaki; Kazuo Isobe, all of Wakayama, Japan

[73] Assignee: Kao Corporation, Tokyo, Japan

[21] Appl. No.: 09/210,461

[22] Filed: Dec. 14, 1998

[30] Foreign Application Priority Data

Dec. 26, 1997  [JP]  Japan ................... 9-359335

[51] Int. Cl.⁷ ................... C09D 195/00; C08L 95/00
[52] U.S. Cl. ................... 106/281.1; 106/284.06; 106/284.1
[58] Field of Search ................... 106/281.1, 284.06, 106/284.1

[56] References Cited

U.S. PATENT DOCUMENTS

| | | | |
|---|---|---|---|
| 2,693,425 | 11/1954 | Hardman | 106/273.1 |
| 5,820,663 | 10/1998 | Miller et al. | 106/284.1 |

FOREIGN PATENT DOCUMENTS

| | | | |
|---|---|---|---|
| 0157210 | 10/1985 | European Pat. Off. . | |
| 49-34519 | 3/1974 | Japan . | |
| 51-149312 | 12/1976 | Japan . | |
| 60-188462 | 9/1985 | Japan . | |
| 832832 | 9/1985 | Japan . | |
| 444794 | 5/1975 | U.S.S.R. | 106/284.1 |

*Primary Examiner*—David Brunsman
*Attorney, Agent, or Firm*—Birch, Stewart, Kolasch & Birch, L.L.P.

[57] ABSTRACT

The present invention provides an asphalt composition comprising an asphalt and antistripping additive comprising at least one of the compound having the formula (I), (II) or (III):

$$[R^1O\text{—}(PO)_m(EO)_n]_x\text{—}P(=O)\text{—}(OH)_y \quad (I)$$

wherein $R^1$ represents a linear hydrocarbon radical having 8 to 24 carbon atoms or an alkyl phenyl group having 8 to 24 carbon atoms, PO represents oxypropylene group, EO represents oxyethylene group, each of m and n represents the number of added molecules, m is a number of 1 to 6, n is a number of 0 to 6;

$$[R^2O\text{—}(PO)_m(EO)_n]_x\text{—}P(=O)\text{—}(OH)_y \quad (II)$$

wherein $R^2$ represents an aliphatic hydrocarbon radical having a branched methyl group and having 8 to 24 carbon atoms, PO represents oxypropylene group, EO represents oxyethylene group, each of m and n represents the number of added molecules, m is a number of 0 to 6, n is a number of 0 to 6; and $$[R^3O\text{—}(PO)_m(EO)_n]_x\text{—}P(=O)\text{—}(OH)_y \quad (III)$$

wherein $R^3$ represents an aliphatic hydrocarbon radical having two or more branched methyl groups or at least one of branched group including 2 or more carbons and having 8 to 24 carbon atoms, PO represents oxypropylene group, EO represents oxyethylene group, each of m and n represents the number of added molecules, m is a number of 0 to 6, n is a number of 0 to 6, each of x and y of the formula (I), (II) or (III) being a number of 1 to 2, the sum total of x and y being 3, $R^1, R^2$ and $R^3$ being saturated or unsaturated.

6 Claims, No Drawings

ASPHALT ADDITIVE

TECHNICAL FIELD TO THE INVENTION

The present invention relates to an asphalt additive which increases the adhesion between asphalt and aggregates and thus prevents the stripping of the asphalt from the aggregates. Further, the present invention relates to an asphalt composition comprising asphalt and the asphalt additive.

PRIOR ART

Asphalt, which is obtained from crude oil, is used as a paving material, a roofing material, a waterproofing material, and in other applications. Among these applications, the largest demand is for pavement. When asphalt is used for pavement, asphalt and aggregates are blended and heated. However, since asphalt is nonpolar and hydrophobic and since aggregates are hydrophilic, the adhesion between the asphalt and the aggregates is not sufficient. Therefore, there is a potential problem the water from rain or underground water may cause the asphalt to strip from the aggregates.

Another problem is that, since the load imposed on the road increases as the amount of traffic increases and the eight of vehicles increases, ruts are made in the asphalt pavement and the asphalt pavement is liable to be fluidized, thereby impeding a smooth traffic and travelling performance. A measure to solve these problems is to increase the consistency of the paving material by the incorporation therein of a thermoplastic resin or a rubber. However, the ruts are formed not only by the load on the road but also by the stripping of asphalt from aggregates due to contact with water and the movement of the thus stripped aggregates. Consequently, the measure to merely increase the consistency of the paving material cannot solve the problem of the formation of ruts which are caused by the stripping of asphalt from aggregates.

As stated above, the technical task to improve an anti-stripping ability by improving the adhesion between asphalt and aggregates is very important from the standpoint of increasing the performance of the asphalt pavement, and therefore a variety of proposals have been made in order to solve the problem.

For example JP-A 49-34519 proposes a method wherein a anti-stripping agent which is a higher aliphatic polyamine or a derivative thereof is incorporated into asphalt. According to this method, if asphalt is blended with the anti-stripping agent, the anti-stripping effect quickly emerges and the aging time required prior to the application of the asphalt can be reduced (this effect is hereinafter referred to as "quick effect"). However, this method presents a problem in terms of heat resistance. That is, if asphalt is blended with the anti-stripping agent and the blend is kept at a high temperature for several hours or tens of hours, the anti-stripping effect diminishes in 2 to 3 days with a result that the anti-stripping effect lasts for only one year or less after the pavement is made by using the blend. In an ordinary work site, since asphalt is used in a molten state by continuous heating, the heat resistance is an important characteristic.

Meanwhile, JP-A 51-149312 proposes an asphalt modifying additive composed of a phosphorus compound such as phosphorus pentaoxide, polyphosphoric acid, phosphorus pentasulfide, or the like. However, since these phosphorus compounds are inorganic compounds, the dispersibility of these compounds in an organic substance such as asphalt is not good. In addition, even after these phosphorus compounds are sufficiently dispersed mechanically in the asphalt, the anti-stripping ability is poor because of poor dispersion stability.

JP-A 60-188462 proposes a method wherein a specific acidic organophosphorous compound is used for improving the anti-stripping ability. Although this method improves the anti-stripping ability in comparison with the other methods, this method cannot fully meet the requirement of quick effect which the market demands. Namely, if the requirement for quick effect is not met, the paving work is prolonged because a sufficiently long time for stirring needs to be secured in order to obtain the anti-stripping ability aimed at.

JP-B 8-32832, corresponding to JP-A 60-188462 and EP-A 157210, discloses an additive to asphalt having a phosphate group.

SUMMARY OF THE INVENTION

An object of the present invention is to provide an asphalt additive which makes it possible to shorten the paving work while ensuring the anti-stripping ability for a long period of time and also the quick effect, irrespective of the kind of asphalt and aggregates and also of paving methods. Another object of the present invention is to provide an asphalt composition comprising the asphalt additive.

After hard studies to solve the above-mentioned problems, the present inventors have achieved the invention based on the findings that a specific phosphoric ester is so excellent in the solubility in and affinity for asphalt that the agitation for blending is substantially unnecessary when the additive is added to the asphalt and that the heat resistance of the specific phosphoric ester is so excellent that the workability at site for paving work can be remarkably improved and further that the specific phosphoric ester makes it possible to quickly obtain the anti-stripping ability equal to or better than the effects described in the aforementioned documents, thus realizing the quick effect and securing the effect for a long period of time.

That is, the present invention provides an asphalt composition comprising an asphalt and an asphalt additive comprising at least one compound having the formula (I), (II) or (III):

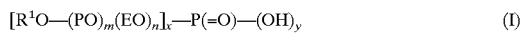

wherein $R^1$ represents a linear hydrocarbon radical having 8 to 24 carbon atoms or an alkyl-phenyl group having 8 to 24 carbon atoms, PO represents oxypropylene group, EO represents oxyethylene group, m and n represent the number of added molecules, m is a number of 1 to 6, n is a number of 0 to 6;

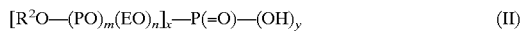

wherein $R^2$ represents an aliphatic hydrocarbon radical having a branched methyl group and having 8 to 24 carbon atoms, PO represents oxypropylene group, EO represents oxyethylene group, m and n represent the number of added molecules, m is a number of 0 to 6, n is a number of 0 to 6 or n is a number of 1 to 6;

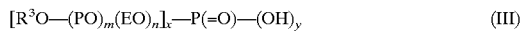

wherein $R^3$ represents an aliphatic hydrocarbon radical having two or more branched methyl groups or at least one branched group including 2 or more carbon atoms and having 8 to 24 carbon atoms, PO represents oxypropylene group, EO represents oxyethylene group, m and n represent the number of added molecules, m is a number of 0 to 6, n is a number of 0 to 6, and each of x and y of the formula (I), (II) or (III) being a number of 1 to 2, the sum total of x and y being 3, $R^1$, $R^2$ and $R^3$ being saturated or unsaturated.

Secondly, the present invention provides the above-mentioned composition in which the additive is in the form of liquid or paste at 40° C.

Thirdly, the present invention provides the above-mentioned composition in which the additive further comprises an aliphatic amine compound.

Fourthly, the present invention provides the above-mentioned composition wherein the branched group of the formula (III) is represented by the following formula (A) or (B):

$$R^4-(R^5-)CH-CH_2- \quad (A)$$

wherein $R^4$ and $R^5$ represent a hydrocarbon radical, either or both of them have two or more carbon atoms, the total carbon number of $R^4$ and $R^5$ is in the range of 6 to 22;

$$R^6-(R^7-)CH- \quad (B)$$

wherein $R^6$ and $R^7$ represent a hydrocarbon radical, either or both of them have two or more carbon atoms, the total carbon number of $R^6$ and $R^7$ is in the range of 7 to 23.

Fifthly, present invention provides use of the above-mentioned compound as an additive to asphalt.

Sixthly, the present invention provides a method of improving an anti-stripping ability of an asphalt composition, which comprises the step of mixing the asphalt and aggregates with the additive as defined above.

Seventhly, the present invention provides the above-mentioned composition wherein the additive has the formula (III).

DETAILED DESCRIPTION OF THE PREFERRED EMBODIMENT

The asphalt additive of the present invention comprises the compound represented by the formula (I), (II) or (III). The asphalt additive may comprise the compound alone or may comprise another component in addition to the compound. Further, the compound represented by the formula (I), (II) or (III) may be used singly or in a combination of two or more of them. Still further, two or more compounds represented respectively by the formula (I), (II) or (III) may be used together. It must be noted that the compound represented by the formula (I), (II) or (III) includes a polymer formed by the condensation of two or more compounds via —OH groups thereby producing a P-O-P linkage.

In the compound which is used in the present invention and which is represented by the formula (I); $R^1$ is a saturated or unsaturated straight, hydrocarbon radical or an alkylphenyl group having 8 to 24 carbon atoms, preferably 8 to 20 carbon atoms and more preferably 10 to 18 carbon atoms. Examples of the saturated or unsaturated hydrocarbon radical and the alkylphenyl group include alkyl groups such as dodecyl, hexadecyl and octadecyl groups, and alkylphenyl groups such as octylphenyl, nonylphenyl and dodecylphenyl groups.

In the compound represented by the formula (I), the order of the oxypropylene group (PO) and the oxyethylene group (EO) is not limited to the indication in the formula (I). Therefore, the order may be the RO-group, the oxyethylene group, the oxypropylene group, and the phosphorus atom. Further, the order of the oxypropylene group and the oxyethylene group may be reversed, or otherwise the oxypropylene group and the oxyethylene group may be added at random. As for the number of moles added of the oxypropylene group and the oxyethylene group, m is 1 to 6, preferably 1 to 4, and more preferably 1 to 2; and n is 0 to 6, preferably 0 to 4, and more preferably 0 to 3. In the compound represented by the formula (I), each of x and y is a number of 1 to 2, provided, however, that x becomes more preferable as x approaches 1, and the sum of x and y is 3.

In the compound which is used in the present invention and which is represented by the formula (II); $R^2$ is a saturated or unsaturated hydrocarbon radical having a branched methyl group and having 8 to 24 carbon atoms, and preferably 8 to 20 carbon atoms and more preferably 10 to 18 carbon atoms. Examples of the saturated or unsaturated hydrocarbon radical corresponding to the straight portion include decyl, dodecyl, tetradecyl and heptadecyl groups. The site where the methyl group is linked is not particularly limited.

The added order of the oxypropylene group and the oxyethylene group as well as x and y which is represented by the formula (II) are the same as those in the compound represented by the formula (I).

As for the number of moles added of the oxypropylene group and the oxyethylene group, m is 0 to 6, preferably 0 to 4, and more preferably 0 to 2; and n is 0 to 6, preferably 0 to 4, and more preferably 0 to 3.

In the compound which is used in the present invention and which is represented by the formula (III); $R^3$ is a saturated or unsaturated hydrocarbon radical having two or more branched methyl groups or at least one branched group having 2 or more carbon atoms and having 8 to 24 carbon atoms, preferably 8 to 20 carbon atoms and more preferably 10 to 18 carbon atoms. Examples of the saturated or unsaturated hydrocarbon radical corresponding to the straight portion include hexyl, decyl and tetradecyl groups. The site where the methyl group or the branched group having 2 or more carbon atoms is linked is not particularly limited. The number of the methyl groups linked is preferably 2 to 5. Examples of the branched group having 2 or more carbon atoms include an alkyl group having 2 to 10 carbon atoms. Among these alkyl groups, preferable groups are ethyl, propyl, hexyl and decyl groups.

The added order of the oxypropylene group and the oxyethylene group as well as x and y which is represented by the formula (III) are the same as those in the compound represented by the formula (I).

As for the number of moles added of the oxypropylene group and the oxyethylene group, m is 0 to 6, preferably 0 to 4, and more preferably 0 to 2; and n is 0 to 6, preferably 0 to 4, and more preferably 0 to 3.

The method for producing the compound represented by the formula (I), (II) or (III) is not particularly limited. An example of the method comprises the steps of adding ethylene oxide and propylene oxide to a saturated or unsaturated alcohol having 8 to 24 carbon atoms by a commonly adopted process to produce an addition polymer and then converting the addition product into a phosphoric ester. The conversion of the addition polymer into a phosphoric ester can be performed by reacting the addition polymer with phosphoric acid anhydride, phosphorus oxytrichloride or phosphorus trichloride.

The asphalt additive of the present invention may further contain an aliphatic amine. The aliphatic amine, which contains a nitrogen atom in the molecule, increases the wettability of asphalt to aggregates at an initial stage.

Examples of the aliphatic amine include higher aliphatic polyamines such as tallow alkyl propylenediamine or derivatives thereof, and alkylol amines such as alkylhydroxyamine, monoethanol amine, diethanol amine and triethanol amine. If such an amine is used, it is preferable to use the asphalt additive at a pH value within a neutral to acidic range. The amount added of the aliphatic amine is preferably 5 to 70% by weight in the asphalt additive and more preferably 10 to 50% by weight.

The state of the asphalt additive of the present invention is not particularly limited. The state may be, for example, a solid, a liquid or a paste. Preferably, the asphalt additive is a liquid or a paste at a temperature of 40° C. so as to improve the workability and the miscibility with asphalt and so as to increase the adhesion between asphalt and aggregates for a long period of time and at an initial stage in particular.

The mechanism by which the asphalt additive of the present invention increases the adhesion between asphalt and aggregates so that the anti-stripping of asphalt from aggregates is conducted for a long period of time is not clarified. Presumably, the effect of the asphalt additive of the present invention is caused by the formation of hydrogen bond by the —OH groups on a surface of the aggregates in a wet state, the formation of a chemical bond through thermal dehydration and the formulation of hydrophobic polymerized film, as described in JP-B 8-32,832, in column 6, lines 17 to 23. Particularly, in the case of the asphalt additive of the present invention, the solubility in and affinity for asphalt is increased by the introduction of a prescribed amount of the oxypropylene group and the oxyethylene group or by the introduction of a specific branched alkyl group into the compound represented by the formula (I), (II) or (III). It is believed that these properties of the asphalt additive bring about the result that the above-described bonds remarkably emerge immediately after the additive is blended in the asphalt and the result that the work time can be shortened and the excellent anti-stripping ability can be obtained immediately after paving and for a long period of time after paving.

Next, detailsof the asphalt composition are given below. The asphalt which is used in the asphalt composition according to the present invention is, for example, a bituminous substance resulting from straight asphalt, semi-blown asphalt, cut-back asphalt, natural asphalt, petroleum tar, pitch, or an asphalt which meets the requirements of the specification of asphalt for road paving and which is produced by blending a softener with solvent-deasphalting.

Such asphalt is incorporated with the asphalt additive. From such standpoints as the improving the adhesion and anti-stripping ability between the asphalt and aggregates, economics, and storage stability, the amount of the asphalt additive to be added is preferably 0.1 to 3% by weight, more preferably 0.2 to 2% by weight, and most preferably 0.3 to 1.5% by weight, based on the amount of the asphalt.

In order to increase the consistency of asphalt, the asphalt composition according to the present invention may contain, for example, a natural rubber, a synthetic rubber, such as styrene/butadiene rubber or chloroprene rubber, a thermoplastic elastomer, a polymer or a copolymer made up of one or more monomers selected from the group consisting of ethylene, vinyl acetate, acrylates, methacrylates, and styrene. The amount of such component is preferably 1 to 20% by weight, and more preferably 3 to 10% by weight, in the composition.

Depending on applications, the asphalt composition according to the present invention may further contain an inorganic filler, such as calcium carbonate, slaked lime, cement or activated carbon, an organic filler, a petroleum resin, a petroleum-derived softener such as polyethylene having a low molecular weight, a vegetable oil-derived softener such as olecic acid, a plasticizer, sulfur, and others.

The method for preparing the asphalt composition according to the present invention is not particularly limited. For example, the asphalt composition can be prepared by adding a prescribed amount of the asphalt additive to asphalt which is molten at a temperature of 100 to 250° C. and which is being stirred. Since the asphalt additive of the present invention has an excellent solubility in and affinity for asphalt, as described previously, ordinarily a special blending operation is not necessary. Therefore, thermal convection flow by heating or the vibration at the time of transportation is sufficient for homogeneous blending. If a quick workability is required, however, the additive may be blend with the asphalt by using a blending apparatus.

Since the asphalt additive of the present invention has an excellent solubility in and affinity for asphalt, the asphalt additive can be homogeneously blended into the asphalt even if a special stirring operation is not employed. In addition, the asphalt composition comprising the asphalt additive has an excellent heat resistance and the asphalt composition exhibits excellent adhesion to aggregates immediately after the asphalt composition is blended with the aggregates. The adhesion lasts for a long period of time. Accordingly, in the case where the asphalt composition of the present invention is used for paving a road, it is possible to carry out the paving work in a shorter time, to ensure the adhesion between the asphalt and the aggregates, and to maintain a good surface condition of road for a long period of time.

EXAMPLES

The following examples further illustrate the present invention. They are not to be construed to limit the scope of the present invention in any manner whatsoever.

EXAMPLES 1~20 AND COMPARATIVE EXAMPLES 1~14

Asphalt additives of the present invention in various states were prepared by using the compounds represented by the formula (I), (II) or (III) as shown in Tables 1 to 3. Next, the asphalt compositions according to the present invention were each prepared by adding the asphalt additive shown in Tables 1 to 3 to asphalt which was molten at a temperature of 180° C. and by stirring the composition for the time period (one minute or 30 minutes) as shown in Tables 1 to 3. In a similar way, the asphalt compositions of Comparative Examples 1~14 were obtained. By using the asphalt compositions thus obtained, the stripping ability of asphalt from aggregates was examined in accordance with the following stripping test of the asphalt film as described in the manual for asphalt pavement (issued from The Japan Road Association). The results are shown in Tables 1 to 3. The details of the compounds represented by the formula (II) or (III), which were used in the asphalt additives in Examples and Comparative Examples, are as follows:

Examples 12~13: R contains one branched methyl group.
Examples 14~16, 18: R has two or more branched methyl groups or has a branched ethyl group.
Example 17 (Tridecanol manufactured by Kyowa Hakko Kogyo Co., Ltd.): alcohol which has 13 carbon atoms and which has 2 to 3 branched methyl groups on an average.
Example 11, Comparative Example 11 (Dobanol 23 manufactured by Mitsubishi Chemical Co., Ltd.): oxo alcohol which has 12 or 13 carbon atoms and which has a ratio of branched methyl groups of 20%.

Example 19 (LIAL 123 manufactured by CONDEA Augusta S.p.A.): a mixture of alcohols, one of which has 12 carbon atoms and the other of which has 13 carbon atoms, and the mixture includes 60 wt % of a methyl-branched alcohol(s).

Example 20 (ISALCHEM 11 manufactured by CONDEA Augusta S.p.A.): an alcohol mixture which has 11 carbon atoms and contains more than 95 wt % of methyl-branched alcohol(s). (Method for testing of anti-stripping)

Aggregates from Takarazuka (quartz porphyry: acidic rock) and aggregates from Kuzu (limestone: basic rock), which had a particle size distribution of from 5 mm to 13 mm by means of a sieve, were used in the test. 100 g of aggregates was well washed and was then placed in a 300 ml metal vessel. The aggregates were then dried. Next, the aggregates were heated for one hour in a thermostatted drier already kept at 150° C. On the other hand, an asphalt composition was heated for a time period (2 hours or 48 hours) shown in Tables 1 to 3 in a thermostatted drier kept at 180° C. Then, 5.5 g of the asphalt composition was added onto the aggregates in the metal vessel. After the addition, the contents in the metal vessel were well stirred for 2 to 3 minutes by means of a spatula to ensure perfect coating of the surface of the aggregates with the asphalt composition. In this way, the surface of the aggregates was entirely coated with the asphalt composition. The coated aggregates thus obtained were spread on a glass plate and the coated aggregates were allowed to stand for 1 to 2 hours for cooling to room temperature. In this way, the asphalt composition was caused to harden. The coated aggregates were immersed in water of a thermostatted bath kept at 80° C. At a point of 120 minutes after the immersion, the state of the coated aggregates in the water was visually inspected. By this inspection, the stripped area percentage of the film of the asphalt composition was obtained based on the area of the film of the asphalt composition at the time when the test started.

TABLE 1

| | | | | | stripped area (%) | | | |
| | | | | | quartz porphyry | | Limestone | |
| Examples | Asphalt additives | state of additive (30° C.) | amount added of additive (% by weight) | time period (in minutes) for stirring after addition | 2 hours | 48 hours | 2 hours | 48 hours |
|---|---|---|---|---|---|---|---|---|
| 1 | mono and di(lauryl alcohol PO1) phosphoric ester | liquid | 0.5 | 1 | 0 | <5 | 0 | 0 |
| 2 | Mono (lauryl alcohol PO1.5EO1) phosphoric ester | liquid | 0.5 | 1 | 0 | <5 | 0 | 0 |
| 3 | Mono and di(myristyl alcohol PO2EO4) phosphoric ester | liquid | 0.5 | 1 | <5 | <5 | 0 | <5 |
| 4 | mono and di(stearyl alcohol PO3EO0.5) phosphoric ester | solid | 0.5 | 1 | <5 | 5 | 0 | <5 |
| 5 | Mono(C16, 18 alcohol PO4EO1.5) phosphoric ester | paste | 0.5 | 1 | <5 | <5 | 0 | <5 |
| 6 | mono and di(stearyl alcohol PO6EO3) phosphoric ester | viscose liquid | 0.5 | 1 | 5 | 10 | <5 | 5 |
| 7 | mono and di(cetyl alcohol PO3.5) phosphoric ester | paste | 0.5 | 1 | <5 | 5 | <5 | <5 |
| 8 | mono and di(octyl alcohol PO1EO1) phosphoric ester | liquid | 0.5 | 1 | <5 | 5 | <5 | <5 |
| 9 | mono and di(coconut oil alcohol PO2EO1) phosphoric ester | liquid | 0.5 | 1 | 0 | <5 | 0 | <5 |
| 10 | Mono(nonylphenol PO1) phosphoric ester | liquid | 0.5 | 1 | <5 | 5 | <5 | <5 |

TABLE 2

| | | | | | stripped area (%) | | | |
| | | | | | quartz porphyry | | Limestone | |
| Examples | Asphalt additives | state of additive (30° C.) | amount added of additive (% by weight) | time period (in minutes) for stirring after addition | 2 hours | 48 hours | 2 hours | 48 hours |
|---|---|---|---|---|---|---|---|---|
| 11 | Mono(Dobanol 23 from Mitsubishi Chemical Co., Ltd. PO1EO2) phosphoric ester | liquid | 0.5 | 1 | <5 | 5 | <5 | <5 |
| 12 | mono and di(2-methyldodecanol EO3) phosphoric ester | liquid | 0.5 | 1 | <5 | 5 | <5 | 5 |
| 13 | mono(2-methyltetradecanol PO1EO3) phosphoric ester | liquid | 0.5 | 1 | <5 | 5 | <5 | <5 |
| 14 | mono and di(2-ethylhexanol) phosphoric ester | liquid | 0.5 | 1 | 5 | 5 | <5 | 5 |
| 15 | Mono(2-hexyldecanol) phosphoric ester | liquid | 0.5 | 1 | 0 | <5 | 0 | <5 |

TABLE 2-continued

| | | | | | stripped area (%) | | | |
| | | | | time period | quartz porphyry | | Limestone | |
| Examples | Asphalt additives | state of additive (30° C.) | amount added of additive (% by weight) | (in minutes) for stirring after addition | 2 hours | 48 hours | 2 hours | 48 hours |
|---|---|---|---|---|---|---|---|---|
| 16 | mono and di(2-octyldodecanol PO2) phosphoric ester | liquid | 0.5 | 1 | <5 | 5 | 0 | <5 |
| 17 | mono(Tridecanol from Kyowa Hakko Co., Ltd.) phosphoric ester | liquid | 0.5 | 1 | 5 | 5 | <5 | 5 |
| 18 | Mono and di(3,3,5-trimethylhexanol EO1.5) phosphoric ester | liquid | 0.5 | 1 | 5 | 10 | 5 | 5 |
| 19 | mono (LIAL 123 by CONDEA) phosphoric ester | paste | 0.5 | 1 | 5 | 5 | 0 | 5 |
| 20 | mono (ISALCHEM 11 by CONDEA) phosphric ester | liquid | 0.5 | 1 | 0 | 5 | 0 | <5 |

Note)
Example 19 and 20 are phosphates represented by formula (II), wherein x is 1, y is 2 and m and n are 0.

TABLE 3

| | | | | | stripped area | | | |
| | | | | Time period | quartz porphyry | | limestone | |
| Comparative Examples | asphalt additives | state of additive (30° C.) | amount added of additive (% by weight) | (in minutes) for stirring after addition | 2 hours | 48 hours | 2 hours | 48 hours |
|---|---|---|---|---|---|---|---|---|
| 1 | none | — | — | — | 60 | 80 | 40 | 70 |
| 2 | phosphoric acid | liquid | 0.5 | 30 | 60 | 80 | 35 | 70 |
| 3 | mixture of mono and di-stearyl phosphates | solid | 0.5 | 1 | 10 | 25 | 10 | 15 |
| 4 | mixture of mono and di-stearyl phosphates | solid | 0.5 | 30 | <5 | 10 | <5 | 10 |
| 5 | mono and di(stearyl alcohol PO15) phosphoric ester | liquid | 0.5 | 30 | 10 | 30 | 10 | 20 |
| 6 | mono and di(lauryl alcohol EO3) phosphoric ester | paste | 0.5 | 30 | 15 | 25 | 10 | 20 |
| 7 | monononylphenol phosphoric ester | solid | 0.5 | 30 | 15 | 40 | 15 | 30 |
| 8 | mono(butylphenol PO8) phosphoric ester | liquid | 0.5 | 30 | 10 | 20 | 10 | 15 |
| 9 | mono(nonylphenol EO5) phosphoric ester | liquid | 0.5 | 30 | 20 | 50 | 20 | 40 |
| 10 | mono and di(2-tridecylheptadecanol) phosphoric ester | solid | 0.5 | 30 | 15 | 30 | 10 | 20 |
| 11 | mono(Dobanol 23 from Mitsubishi Chemical Co., Ltd.) phosphoric ester | solid | 0.5 | 30 | 10 | 20 | 10 | 15 |
| 12 | tallow alkyl propylenediamine | solid | 0.5 | 30 | 20 | 60 | 10 | 50 |
| 13 | tallow alkyl propylenediamine EO3 | liquid | 0.5 | 30 | 30 | 60 | 10 | 40 |
| 14 | 1-aminoethyl-2-heptadecenylimidazoline | liquid | 0.5 | 30 | 20 | 70 | 10 | 50 |

As can be seen from Tables 1 to 3, the asphalt compositions of Examples 1 to 18 exhibit little or no stripping irrespective of the kind of the aggregates. In particular, the anti-stripping effect was higher where the asphalt additives were in the state of a liquid. The fact that the stripping did not occur even in a severe condition, i.e., immersion in water at 80° C. for 120 minutes, indicates that the asphalt additive of the present invention has a quick effect which imparts an excellent anti-stripping effect to asphalt immediately after the addition of the additive. Generally, the anti-stripping effect lasts at least 3 to 5 years, although the durability varies depending on meteorological conditions and traffic conditions. Since this excellent anti-stripping effect can be obtained only after about 1 minute's stirring of asphalt when the asphalt additive is added to the asphalt, the excellent solubility and affinity of the asphalt additive of the present invention were confirmed. In addition, the continuous heating of 48 hours did not impair the anti-stripping ability. Consequently, the characteristics of the asphalt composition according to the present invention, i.e., excellent heat resistance and requirement of only short time for stirring, can significantly improve the workability at site, in view of the situation that asphalt is heated continuously for a long time in the case of, for example, paving operations at night.

To the contrary, the asphalt compositions of Comparative Examples 1 to 14 were remarkably inferior with respect to the anti-stripping ability. In addition, since a long time is required for stirring and since the heat resistance of these asphalt compositions is inferior, the workability at site is impaired.

We claim:

1. An asphalt composition comprising an asphalt and an asphalt additive comprising at least one compound having the formula (I), (II) or (III):

$$[R^1O-(PO)_m(EO)_n]_x-P(=O)-(OH)_y \quad (I)$$

wherein $R^1$ represents a linear hydrocarbon radical having 8 to 24 carbon atoms or an alkyl-phenyl group having 8 to 24 carbon atoms, PO represents oxypropylene group, EO represents oxyethylene group, m and n represent the number of added molecules, m is a number of 1 to 6, n is a number of 0 to 6;

$$[R^2O-(PO)_m(EO)_n]_x-P(=O)-(OH)_y \quad (II)$$

wherein $R^2$ represents an aliphatic hydrocarbon radical having a branched methyl group and having 8 to 24 carbon atoms, PO represents oxypropylene group, EO represents oxyethylene group, m and n represent the number of added molecules, m is a number of 0 to 6, n is a number of 0 to 6;

$$[R^3O-(PO)_m(EO)_n]_x-P(=O)-(OH)_y \quad (III)$$

wherein $R^3$ represents an aliphatic hydrocarbon radical having two or more branched methyl groups or at least one branched group including 2 or more carbon atoms and having 8 to 24 carbon atoms, PO represents oxypropylene group, EO represents oxyethylene group, m and n represent the number of added molecules, m is a number of 0 to 6, n is a number of 0 to 6, each of x and y of the formula (I), (II) or (III) being a number of 1 to 2, the sum total of x and y being 3, $R^1, R^2$ and $R^3$ being saturated or unsaturated.

2. The composition as claimed in claim 1, in which the additive is in the form of liquid or paste at 40° C.

3. The composition as claimed in claim 1, in which the additive further comprises an aliphatic amine compound.

4. The composition as claimed in claim 1, wherein the branched group of the formula (III) is represented by the following formula (A) or (B):

$$R^4-(R^5-)CH-CH_2- \quad (A)$$

wherein $R^4$ and $R^5$ represent a hydrocarbon radical, either or both of them have two or more carbon atoms, the total carbon number of $R^4$ and $R^5$ is in the range of 6 to 22;

$$R^6-(R^7-)CH- \quad (B)$$

wherein $R^6$ and $R^7$ represent a hydrocarbon radical, either or both of them have two or more carbon atoms, the total carbon number of $R^6$ and $R^7$ is in the range of 7 to 23.

5. A method of improving an anti-stripping ability of an asphalt composition, which comprises the step of mixing the asphalt and aggregates with the additive as defined in claim 1.

6. The composition as claimed in claim 1, wherein the additive has the formula (III).

* * * * *